United States Patent [19]

Reuter et al.

[11] Patent Number: 5,538,336
[45] Date of Patent: Jul. 23, 1996

[54] INTEGRATED ABS/TCS HYDRAULIC MODULATOR BRAKING SYSTEM

[75] Inventors: David F. Reuter, Beavercreek, Ohio; Viswanath Seetharaman, Anderson, Ind.

[73] Assignee: General Motors Corporation, Detroit, Mich.

[21] Appl. No.: 362,229

[22] Filed: Dec. 23, 1994

[51] Int. Cl.$^6$ ........................................... B60T 8/34
[52] U.S. Cl. ........................... 303/119.2; 303/113.2; 303/116.2
[58] Field of Search ..................... 303/10, 11, 113.1, 303/113.2, 116.1, 116.2, 119.2, 117.1, 84.2, 113.5, 901, DIG. 1, DIG. 2

[56] References Cited

U.S. PATENT DOCUMENTS

| | | | |
|---|---|---|---|
| 4,898,430 | 2/1990 | Becker-Endrigkeit et al. | 303/DIG. 2 |
| 4,938,545 | 7/1990 | Shuey et al. | 303/119.2 |
| 5,172,963 | 12/1992 | Brown | 303/113.2 |
| 5,221,126 | 6/1993 | Inoue | 303/113.2 |
| 5,221,129 | 6/1993 | Takasaki | 303/117.1 |
| 5,312,175 | 5/1994 | Ando et al. | 303/117.1 |
| 5,326,160 | 7/1994 | Bayliss et al. | 303/113.2 |

*Primary Examiner*—Matthew C. Graham
*Attorney, Agent, or Firm*—Jeffrey A. Sedlar

[57] ABSTRACT

An integrated ABS/TCS braking system utilizes individual ABS pressure release and apply for each vehicle wheel independently and provides TCS brake intervention through solenoid valve control of selected vehicle wheels.

9 Claims, 5 Drawing Sheets

INTEGRATED ABS/TCS HYDRAULIC MODULATOR BRAKING SYSTEM

BACKGROUND OF THE INVENTION

The present invention relates to vehicle braking systems and more particularly, to systems with anti-lock braking (ABS) and traction control (TCS) capability.

The subject of this application is related to the following co-pending patent applications: U.S. Ser. No. 08/362,227, entitled "Two-Position Three-Way solenoid Valve," U.S. Ser. No. 08/363,080 entitled "Hydraulic ABS Modulator" and U.S. Ser. No. 08/362,228 entitled "Brake System With Hydraulic ABS Modulator," all commonly assigned, filed on Dec. 23, 1994 and all three of which are hereby, specifically incorporated herein by reference.

Conventional vehicle fluid brake systems are characterized by providing the ability for effective wheel braking in response to manual application of force to a brake pedal actuator. The art has adapted the conventional vehicle fluid brake system to automatic control mechanisms which represent a combination of hydraulic and electrical control and provide advanced braking functions. One such mechanism, ABS, typically modulates the fluid pressure delivered to a vehicle wheel brake to prevent the brake from locking up in certain braking situations. Another such mechanism, TCS, typically modulates the fluid pressure delivered to a vehicle wheel brake to prevent spinning of a powered wheel to improve the traction that is exerted by the vehicle's drive wheels. When a vehicle is being braked or accelerated an ABS or TCS system operates to improve the force between each controlled wheel and the road surface for improved vehicle braking or acceleration.

The adaptation of conventional vehicle braking systems has presented the challenge to provide a competitive, integrated braking system that is capable of providing normal braking, anti-lock braking to and traction control operation for the various types of fluid braking systems available. The problem posed in developing an integrated ABS/TCS braking system is to provide optimum operation considering system response, adaptability and efficiency while concurrently avoiding unnecessary complexity and cost. This presents a significant challenge in the development of braking systems.

SUMMARY OF THE INVENTION

The present invention concerns a vehicle braking system that is capable of providing four wheel ABS and TCS control to a base brake system. The base brake system comprises a conventionally-boosted reservoir-fed master cylinder interconnected with four conventional wheel brakes. The base brake system is arranged in a two channel front-rear or diagonally (cross) split circuit, a three channel front-front-rear circuit or a four channel circuit.

The ABS control function is generally provided for each wheel independently regardless of the specific type of braking circuit arrangement utilized with the primary exception that in three channel systems ABS control is provided for the combined two rear wheel channels. Each wheel circuit includes hydraulic modulator elements that effect a means of releasing and applying hydraulic pressure to the wheel brake to prevent wheel lock. A preferred embodiment includes a hybrid ABS arrangement with an apply solenoid and release solenoid combination for each front wheel and an orifice/isolation valve arrangement and release solenoid combination for each rear wheel.

The TCS function is provided dependent upon the type of braking circuit utilized and the preferred control modes. An example is a front wheel drive vehicle with a diagonally spilt braking circuit which includes two TCS solenoid valves, each one for providing a traction control brake intervention type function to one front wheel. Another example is a rear wheel drive vehicle with a front/rear split braking circuit which includes one TCS solenoid valve for providing a traction control brake intervention type function to both rear wheels. A further example is a rear wheel drive vehicle which further desires to have a traction control brake intervention type function on the front wheels so as to be able to effect vehicle handling and dynamics. In this example two TCS solenoid valves are included one for the front channel and one for the rear channel to maintain the hydraulic separation between the front and rear master cylinder circuits.

As is apparent to one skilled in the art and as further clarified by the following description, these examples are not exhaustive of the types of TCS arrangements contemplated by the present invention.

DETAILED DESCRIPTION OF THE PRESENTLY PREFERRED EMBODIMENT

Figure 1:
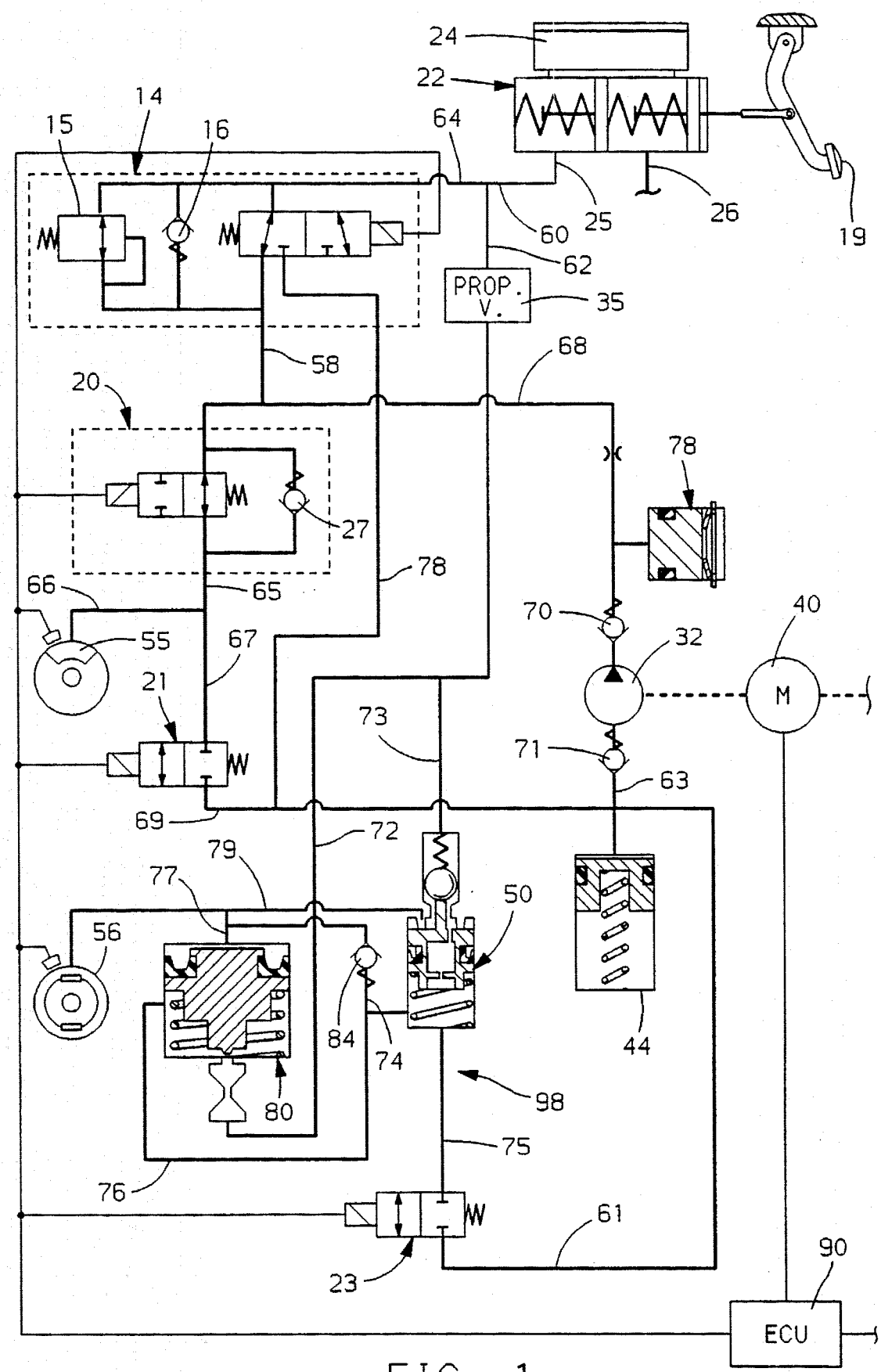
FIG. 1 is a partial graphic symbol fluid diagram of a brake system according to the present invention.

Referring to FIG. 1, illustrated is one master cylinder circuit of a diagonally spilt braking system for a front wheel drive vehicle with ABS and TCS capability.

Essentially half of a brake system according to the present invention is shown. Master cylinder 22, pump 32 and ECU 90 operate with an entire system that includes an additional two-wheel brake control in the same manner as the control for wheel brakes 55 and 56. Generally, the portion of the system shown includes that portion of a brake modulator for supplying one front and one rear wheel brake of a diagonally split two-channel system.

In greater detail, master cylinder 22 has fluid reservoir 24 integrated therewith for supplying fluid through ports 25 and 26 to two separate braking channels. The channel supplied by port 25 being described in detail is meant to illustrate both channels which are substantially identical.

The master cylinder 22 is of the conventional dual piston type and includes dual pressure chambers one in fluid communication with port 25 and the other being in fluid communication with port 26. Fluid reservoir 24 supplies fluid to the master cylinder 22 during operation. By cooperating with a brake pedal actuator 19 a selectively applied means of manual actuation is provided for the master cylinder 22.

Leading from port 25 of master cylinder 22 is conductor 60. Conductor 60 branches into conductors 62 and 64. Conductor 62 generally supplies fluid to rear wheel brake 56. Conductor 64 generally supplies fluid to front wheel brake 55.

Conductor 64 extends to TCS solenoid valve 14. For normal base brake operation and normal ABS operation, TCS solenoid valve 14 provides a normally open flow passage between conductors 64 and 58. Upon the occurrence of selected criteria, TCS solenoid valve 14 intervenes in the brake system operation as is further described below.

Conductor 58 extends between TCS solenoid valve 14 and apply solenoid valve 20. Interconnected with conductor 58 is conductor 68. Conductor 68 originates at pump 32 and includes check 70 and an optional damper assembly 78. Damper assembly 78 is preferably provided to dampen pulsations generated by pump 32 during operation.

Apply solenoid valve 20 is embodied as a two-way solenoid operated valve with an integral check. In its normally opened condition apply solenoid valve 20 provides an unhindered fluid passage from master cylinder 22, on through conductors 65 and 66 to wheel brake 55.

When energized, apply solenoid 20 is moved to a closed condition which prohibits flow through the valve from conductor 64 to conductor 65 while concurrently, even in the closed condition, a flow of fluid is permitted through the integral check 27 from conductor 65 to conductor 58. While in the illustrated embodiment the check is integrated into an assembly with apply solenoid valve 20 the check 27 is optionally provided in parallel as a separate modulator component.

Interconnected with conductor 65 is conductor 67 which leads to release solenoid valve 21. Release solenoid valve 21 comprises a normally closed solenoid actuated valve. In its normally closed condition, release solenoid valve 21 prohibits flow between conductor 67 and conductor 69. When energized, release solenoid valve 21 freely permits the flow of fluid between conductor 67 and conductor 69. Conductor 69 is interconnected with conductor 63. Conductor 63 returns to pump 32 completing a circuit for the supply and return of fluid from wheel brake 55 and includes check 71. Conductor 63 is also in fluid communication with pump inlet accumulator 44. Accumulator 44 provides a point for receiving released fluid from wheel brake 55 through release solenoid 21 from where it is available to be pumped back to wheel brake 55 or master cylinder reservoir 24 by pump 32.

Conductor 62 interconnects with conductor 60 and therethrough is in fluid communication with port 25 of master cylinder 22 providing a means of supplying fluid to rear wheel brake 56. A proportioner 35 is provided in conductor 62 upstream of rear brake 56 and its associated modulator circuit to selectively proportion fluid pressure to wheel brake 56 in relation to wheel brake 55 from master cylinder 22 as predetermined according to system design criteria.

Conductor 62 branches into conductors 72 and 73. Conductors 72 and 73 provide parallel flow paths for fluid flowing from conductor 62 to the wheel brake 56. Apply orifice isolation valve assembly 80 is in communication with conductor 72 and embodies a combination isolation valve and apply orifice providing a fixed restriction to fluid flow. Conductor 76 extends between apply orifice isolation valve 80 and base brake isolation valve 50. Conductor 77, at the end of the piston chamber of apply orifice isolation valve assembly 80, is in communication with conductor 79 and with conductor 76 through check relief valve 164. Conductor 73 is in fluid communication with chamber 49 of base brake isolation valve 50. In normal braking operation fluid flow through both conductors 72 and 73 enters base brake isolation valve 50 and exits into conductor 79 toward wheel brake 56.

Figure 3:
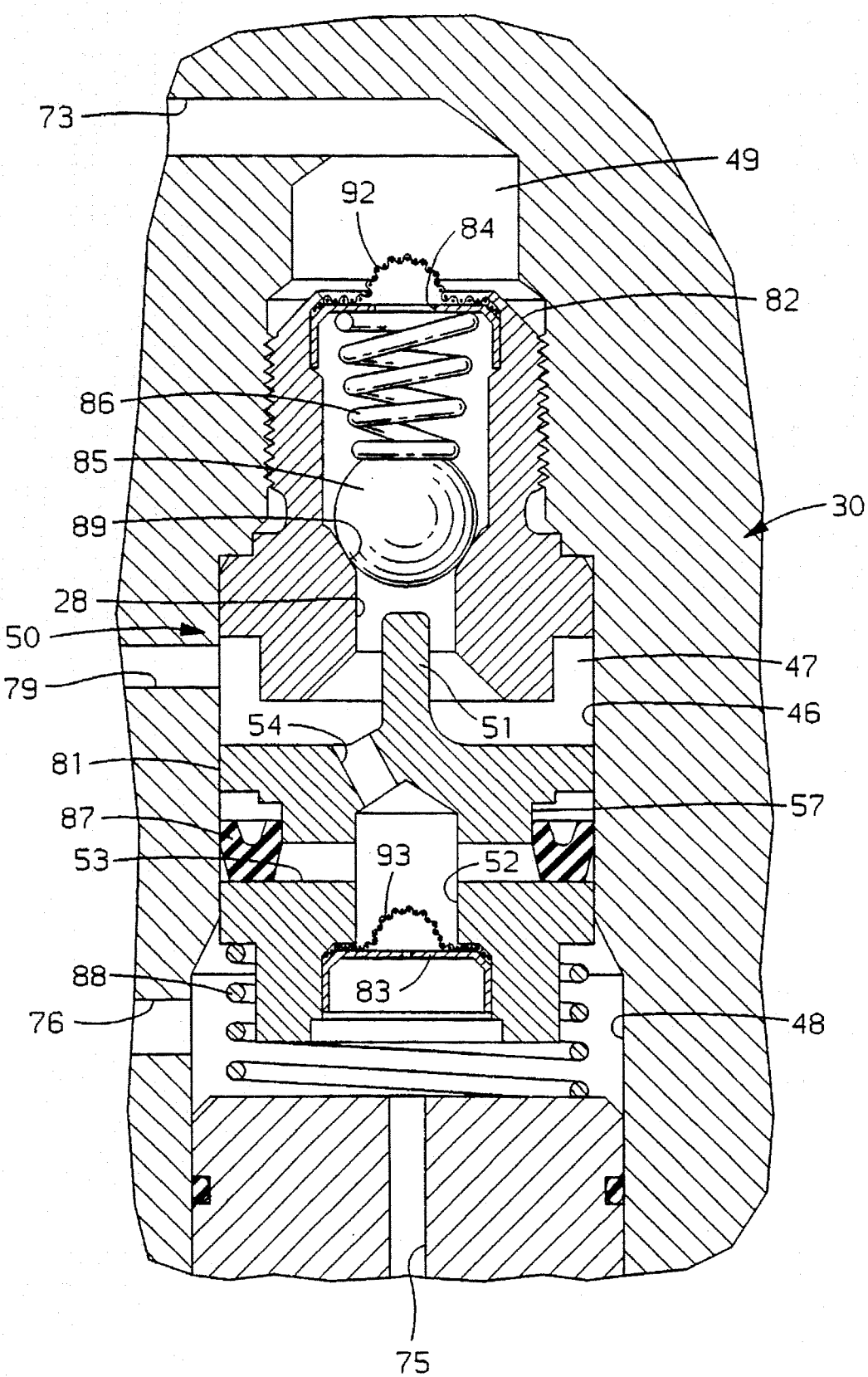
FIG. 3 is a detail schematic illustration of a base brake isolation valve shown in the closed position.

Referring to FIG. 3, base brake isolation valve assembly 50 is illustrated in greater detail. Base brake isolation valve assembly 50 is disposed in bore 46 of module 30. Insert 82 is fixed in position in bore 46 and includes axial bore 28. Formed along axial bore 28 by insert 82 is valve seat 89. Spring retainer 84 engages insert 82 and retains spring 86 in axial bore 28. Ball 85 is also contained in axial bore 28 and is biased against valve seat 89 by spring 86.

Also positioned in bore 46 is piston 81. Piston 81 includes circumferential annular groove 57 which carries lip seal 87. Axial bore 52 extends partially into piston 81 and interconnects with release bore 54 which is angularly disposed and interconnected with axial bore 52 such that a fluid passageway is established through piston 81. A cross bore 53 extends through piston 81 at circumferential annular groove 57 and interconnects with axial bore 52. ABS release orifice 83 engages piston 81 and establishes a fixed restriction to fluid flow between axial bore 52 of piston 81 and chamber 48.

Piston 81 also includes protrusion 51 which is shaped for extending into axial bore 28 of insert 82 at valve seat 89. Spring 88 biases piston 81 toward insert 82 such that protrusion 51 normally moves ball 85 to compress spring 86 and remain positioned off valve seat 89. This maintains a normally open flow path between chamber 49 and chamber 47. (FIG. 3 illustrates base brake isolation valve assembly 50 in a closed position). Chamber 47 is in fluid communication with conductor 79 which leads to wheel brake 56 as shown in FIG. 1. Therefore, during normal braking operation, fluid from conductor 73 entering base brake isolation valve assembly 50 at chamber 49 is free to pass on to wheel brake 56.

Additionally, fluid flow during normal braking operation passes through apply orifice isolation valve assembly 80 from conductor 72, travels into chamber 48 whereupon the pressurized fluid compresses lip seal 87 and passes relatively uninhibited into chamber 47 and on through conductor 79 to wheel brake 56. Cross bore 53 is positioned adjacent lip seal 87 to facilitate operation of lip seal 87 and improve the reverse flow of fluid from chamber 48 to chamber 47.

Figure 4:
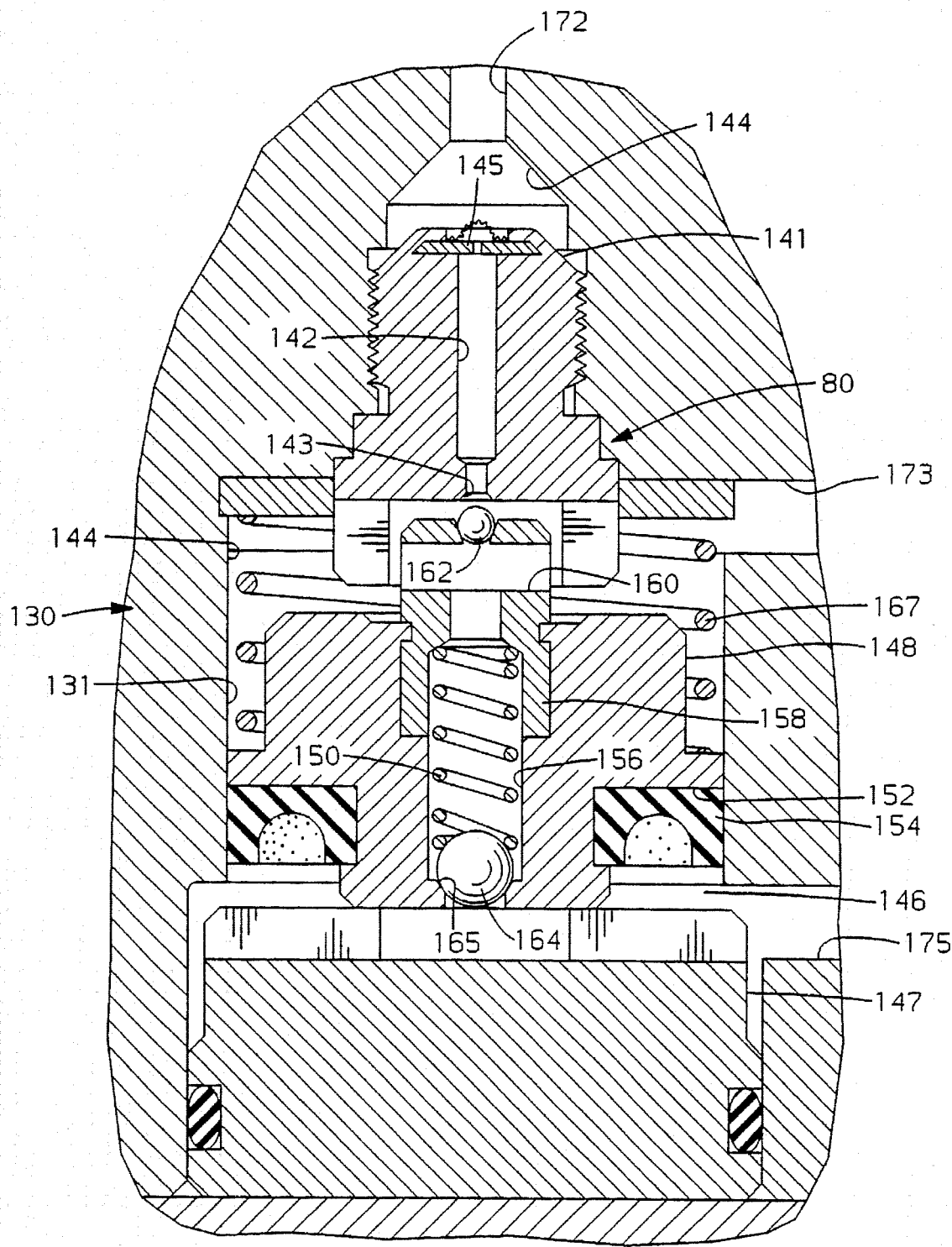
FIG. 4 is a detail schematic illustration of an apply orifice isolation valve assembly.

Referring to FIG. 4, apply orifice isolation valve assembly 80 is illustrated in greater detail. Apply orifice isolation valve assembly 80 is disposed in bore 131 of module 130. Insert 141 is fixed in bore 131 and includes axial bore 142 which forms valve seat 143. Apply orifice 145 engages insert 141 and is positioned along axial bore 142. The position of insert 141 in bore 131 forms a chamber 144 which is in fluid communication with port 172. Port 172 is in fluid communication with conductor 72 and therethrough with brake master cylinder 22 as illustrated in FIG. 1.

Piston 148 is slidably disposed in bore 131 between insert 141 and element 147. Piston 148 includes circumferential annular step 152 which carries lip seal 154. Bore 156 extends axially through piston 148. Insert 158 is fixedly disposed in bore 156 of piston 148 and includes cross bore 160. Ball 162 is affixed to insert 158. Ball 164 is carried in bore 156 and is biased by spring 150 against valve seat 165. Piston 148 is biased against element 147 by spring 167 such that a flow passage is normally open between axial bore 142 and chamber 144 through valve seat 143.

Communicating with bore 131 is port 173 which communicates through conductor 76 with base brake isolation valve 50 and port 175 which communicates through conductors 77 and 79 with wheel brake 56 and base brake isolation valve 50, as illustrated in FIG. 1.

Lip seal 154 engages the wall of bore 131 such that fluid is allowed to communicate from chamber 144 to chamber 146 when a relatively low pressure differential exists therebetween. To compress lip seal 154 and establish flow from chamber 144 to 146 the greater fluid pressure must occur in chamber 144.

Ball 164 is normally biased against valve seat 165 by spring 150 such that fluid communication between chambers 146 and 144 is normally prohibited. However, in order to protect valve seat 143 from excessively high loads ball 164 moves to compress spring 150 and thereby move off valve seat 165 opening a flow passage between chambers 146 and 144 when a sufficiently high pressure differential exists therebetween, with the greater fluid pressure occurring in chamber 146.

Figure 5:
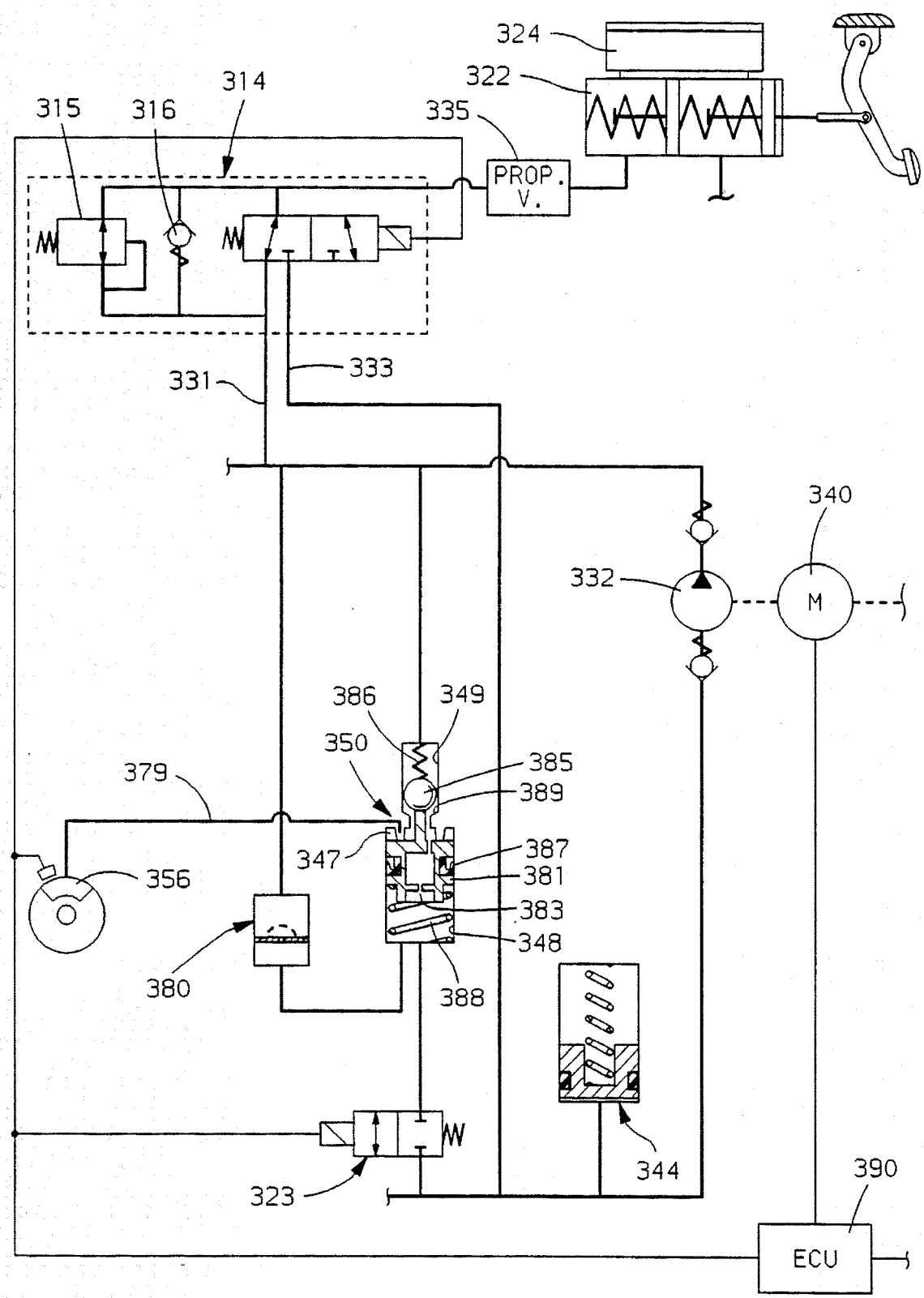
FIG. 5 is a partial graphic symbol fluid diagram of a brake system according to the present invention.

A simplified embodiment of the present invention contemplates replacing apply orifice isolation valve assembly 80 with a simple apply orifice such as orifice 380 as illustrated in FIG. 5 and which is described below. When utilizing an apply orifice without an apply isolation valve in place, some apply pressure would be routed to wheel brake 56 through conductor 77 during ABS release. Therefore, when an apply orifice is used without an apply isolation valve, it is disposed such that all fluid is routed to chamber 48 of the base brake isolation valve 50. This ensures that apply pressure during ABS release is directly routed through conductor 75 and release solenoid valve 23. This routing directs apply pressure during ABS apply through the apply orifice, into chamber 48 of the base brake isolation valve 50, past lip seal 87 and then through chamber 46 out to the wheel brake 56.

Referring again to FIG. 1, conductor 75, which is in fluid communication with chamber 48 of base brake isolation valve 50, extends to release solenoid 23. Release solenoid 23 comprises a normally closed solenoid operated valve. Conductor 61 extends from release solenoid 23 to conductor 63 where fluid communication is established with pump 32 and accumulator 44. Therefore, conductor 61 provides a return from the rear wheel brake circuit to pump 32 thereby completing the circuit.

In base brake operation, master cylinder 22 is power boosted by a conventional means (not illustrated), for providing fluid flow to the front wheel brake 55 and rear wheel brake 56. Upon actuation of master cylinder 22 fluid exits ports 25 and 26 through conductors 60 and 59 into the hydraulic modulator. Fluid pressure is provided for the operation of one braking channel through conductor 60 for one front wheel brake 55 and one rear wheel brake 56. Fluid flow to the front wheel brake 55 passes unrestricted through a normally open passage of TCS solenoid valve 14 aided by the built-in forward flow check valve bypass 16 and through normally open apply solenoid valve 20 on to wheel brake 55. When master cylinder 22 operates to release pressure, fluid flow from wheel brake 55 flows uninhibited through the associated conductors, apply solenoid valve 20, reverse flow bypass check valve 27 and TCS solenoid valve 14, to fluid reservoir 24.

Also during base brake operation fluid pressure from master cylinder 22 passes into conductor 62 through proportioner 35 and subsequently, parallel flow paths are provided through apply orifice isolation valve assembly 80 and base brake isolation valve assembly 50. Apply orifice isolation valve 80 is in fluid communication with master cylinder 22 through conductors 72, 62 and 60, with chamber 48 of base brake isolation valve 50 through conductor 76, with chamber 47 of base brake isolation valve 50 through conductors 77 and 79 and with wheel brake 56 through conductors 77 and 79. The base brake isolation valve 50 is in fluid communication with master cylinder 22 through conductors 73, 62 and 60, with wheel brake 56 through conductor 79, with apply orifice isolation valve 80 through conductors 76 and through conductors 79 and 77 and with release solenoid valve 23 through conductor 75. Release solenoid 23 comprises a normally closed solenoid operated valve and is disposed in the circuit between base brake isolation valve 50 and accumulator 44.

Referring to FIG. 1, the operation of rear wheel brake circuit 98 will be described with reference to FIGS. 3 and 4 for details of base brake isolation valve assembly 50 and apply orifice isolation valve 80 respectively. In the base brake mode of operation fluid flow in the rear brake circuit 98 diverges into parallel paths through the base brake isolation valve 50 and apply orifice isolation valve 80. From each valve fluid flow is ultimately directed through conductor 79 to wheel brake 56.

In base brake operation the ball 85 of base brake isolation valve 50 is maintained in an unseated position off valve seat 89 by protrusion 51, (FIG. 3 illustrates ball 85 in the closed position). The piston 81 is biased by spring 88 such as to force protrusion 51 to unseat ball 85. The passageway embodied by release bore 54, axial bore 52 and ABS release orifice 83 through piston 81, provides hydraulic balancing between chambers 48 and 47 sufficient to assure that the base brake isolation valve 50 remains open during base brake operation. This provides the advantage that minimal flow orificing is provided during base brake operation between the master cylinder 22 and the wheel brake 56.

Additionally, for reverse flow in base brake operation when a driver's foot is released from the brake pedal actuator 19, fluid is forced, with the retraction of wheel brake 56, through the hydraulic modulator and the associated conductors back to the master cylinder 22. Fluid enters the base brake isolation valve 50 and flows unrestricted past ball 85. The apply orifice isolation valve 80 also remains fully open during base brake apply thus permitting additional brake fluid to flow in both parallel flow paths to wheel brake 56.

The ABS mode of operation is engaged when a predetermined amount of wheel slip is detected in a braking stop and the ECU 90 determines that corrective action of brake pressure regulation is necessary. Motor 40 is immediately turned on and continues to run for the remainder of the ABS cycle. If ABS regulation of the front wheel brake 55 is required, normally closed release solenoid valve 21 is energized and therefore, opened. In coordination, apply solenoid valve 20 is closed. Therefore, fluid pressure at wheel brake 55 is released through release solenoid valve 21 and is allowed to temporarily collect in accumulator 44 and return to pump 32 through conductor 63. Apply solenoid valve 20 and release solenoid valve 21 are cycled accordingly to bring the vehicle to a stop while inhibiting premature lockup of wheel brake 55. A pressure hold cycle with the apply solenoid valve 20 held closed and the release solenoid valve 21 held closed is optionally provided for additional wheel slip control strategies.

If ABS regulation of the rear wheel brake 56 is required, the release solenoid valve 23 is energized to initiate a pressure release cycle. The opening of release solenoid valve 23 creates a pressure drop in chamber 48 on the bottom side of the base brake isolation valve piston 81. In reaction, piston 81 moves against the force of spring 88 such that protrusion 51 is retracted from valve seat 89 and ball 85 is biased against the valve seat 89 by spring 86, as illustrated in FIG. 3. This closes off flow through the base brake isolation valve 50 between chamber 49 and chamber 47. The base brake isolation valve 50 remains closed until the hydraulic force imbalance is substantially equalized between chambers 47 and 49. The drag force of lip seal 87 against the wall of bore 46 is not significant in inhibiting movement of piston 81 to reopen the passageway by unseating ball 85.

During ABS release, a pressure imbalance between chambers 47 and 48 is caused by the flow of fluid through release orifice 83 which simultaneously creates a pressure imbalance across the apply orifice isolation valve piston 148. A drop in pressure in chamber 144 relative to the pressure in chamber 146, causes the piston 148 to move and compress spring 167 placing ball 162 against valve seat 143 and thus closing the flow of apply fluid through the apply orifice isolation valve 80. The application of fluid into the wheel brake 56 is prevented during an ABS release cycle until the release flow is sufficiently small to reduce the pressure drop across the release orifice 83 between chambers 47 and 48 of base brake isolation valve 50 to less than the apply pressure of master cylinder 22 divided by the hydraulic gain of the apply orifice isolation valve 80.

The hydraulic gain is the ratio of the area of piston 148 to the open cross-sectional area through valve seat 143 minus the seal and spring losses. In the present embodiment the hydraulic gain is established such that the apply orifice isolation valve 80 will remain closed well below 25 psi braking pressure which is generally sufficient to inhibit lockup of wheel brake 56 even in extreme limited friction situations.

During the ABS release cycle, flow through the release solenoid 23 immediately starts to fill the pump inlet accumulator 44 which permits an immediate pressure reduction at wheel brake 56. As the pump motor 40 achieves full speed fluid is simultaneously pumped from the inlet accumulator 44 to pressurize the modulator circuit. Pressure thus becomes available again for use at the wheel brake 56 as needed. To minimize any effects that pulsation cycles created by pump 32 may have, a pump orifice and damper assembly 78 is optionally used.

Following the release portion of an ABS cycle, as the pressure at wheel brake 56 is sufficiently reduced to prevent wheel lock the next event is to initiate increasing pressure at wheel brake 56 to maximize braking forces. This is accomplished by de-energizing and thus closing the release solenoid 23. When fluid flow ceases, pressure is equalized on both sides of the apply orifice isolation valve assembly piston 148 through the release orifice 83 of base brake isolation valve 50. The resulting force of the spring 167 and the fluid pressure times the open area at valve seat 143 moves the piston 148 to open the passageway through the apply orifice 145. Fluid pressure is subsequently fed through apply orifice 145 to the wheel brake 56 at a controlled apply rate based upon the pressure differential between the master cylinder 22 and the wheel brake 56. The apply orifice 145 is sized to compensate for caliper stiffness and the desired ABS apply rates.

Forming the apply orifice 145 thin and as square-cornered as possible minimizes changes in flow rates for a given pressure differential for varying viscosity effects thus producing more consistent pressure apply rates. The lip seal 154 provides a parallel flow path between apply orifice 145 and the wheel brake 56, one path being past the lip seal 154 and the other being through port 173, conductor 76 and the base brake isolation valve 50 and thus through release orifice 83 and lip seal 87.

If wheel lock is once again approached supplemental release and apply cycles are repeated as often as required to achieve the desired ABS control. Constant pressure at wheel brake 56 is optionally simulated by providing pulsed opening and closure of the release solenoid 23 to provide an average pressure band width approximation of the desired constant pressure.

When the pressure at wheel brake 56 approaches the pressure at master cylinder 22 both base brake isolation valve 50 and apply orifice isolation valve assembly 80 are hydraulically forced to open and the normal base brake function is resumed. At any point in the cycle, the ABS operation is resumable by operation of the release solenoid 23 according to ECU control.

Figure 2:
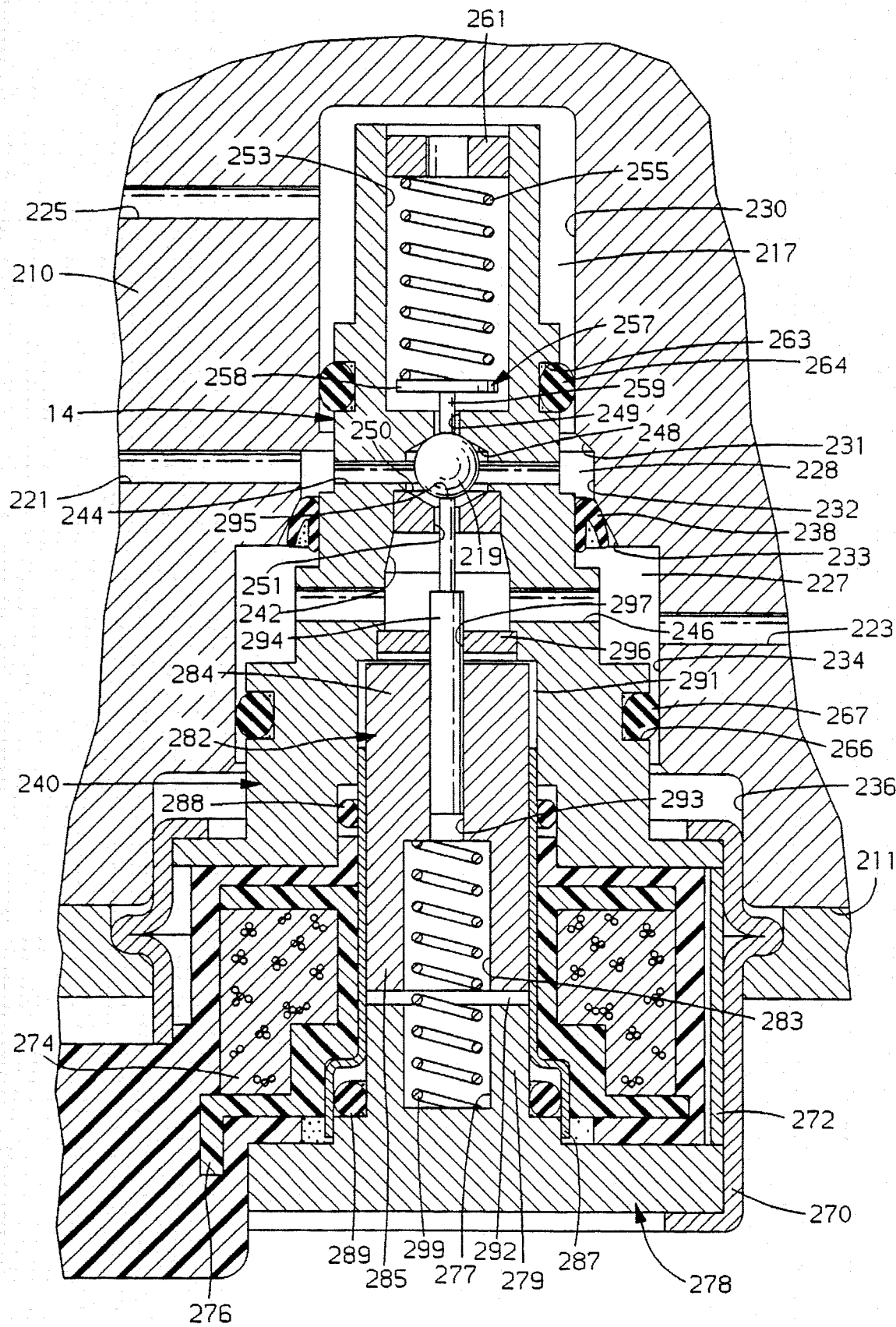
FIG. 2 is a detail schematic illustration of a TCS solenoid valve.

Illustrated in FIG. 2 is TCS solenoid valve 14, shown in greater detail than FIG. 1. Other valve arrangements are possible to provide the specific features provided by the present invention while preferably maintaining a simplified configuration.

TCS solenoid valve 14 is disposed in module 210 which provides a first port 221, a second port 223 and a third port 225. Ports 221, 223, and 225 comprise bores which extend through module 210 to cavity 217. Describing TCS solenoid valve 14 in the circuit of FIG. 1, port 221 communicates with conductor 64 and Master cylinder 22 therethrough, port 223 communicates with conductor 58 and wheel brake 55 therethrough and port 225 communicates with conductor 78 and the inlet of pump 32 therethrough.

Cavity 217 provides a specifically formed opening for the insertion of TCS solenoid valve 14. Cavity 217 includes generally cylindrical openings arranged in a succeedingly larger diameter towards the outer surface 211 of module 210 identified as cylindrical segments 230, 232, 234, and 236. Interposed between cylindrical segments 230 and 232 is frusto-conical segment 231. Interposed between the cylindrical segments 232 and 234 is frusto-conical segment 233.

TCS solenoid valve 14 includes an integrated valve and solenoid actuator assembly. Housing 240 provides generally, a base for the valving and actuating components. An axial opening 242 extends through housing 240. Extending transversely through housing 240 are bore 244 and bore 246 which provide fluid passageways. Housing 240 also includes a valve seat 248 which is coaxially disposed with axial opening 242.

Also coaxially disposed with axial opening 242 of housing 240 is insert valve seat 250 which is positioned in an opposed relationship with, and across bore 244 from, valve seat 248. Insert valve seat 250 includes axial opening 251 and valve seat 248 includes axial opening 249.

Positioned between valve seat 248 and insert valve seat 250 is ball 219. Ball 219 functions as an obturator, operating to alternately close the axial opening 251 in insert valve seat 250 and the axial opening 249 of valve seat 248.

Housing 240 includes chamber 253 in which spring 255 is positioned. Also contained within chamber 253 is plunger 257 which includes spring seat 258 and rod 259. Rod 259 extends from spring seat 258 through axial opening 249 and contacts ball 219. The spring 255 is compressed between spring seat 258, plunger 257 and spring retainer 261 such that it operates to force rod 259 against ball 219.

Positioned in groove 263 between housing 240 and cavity 217 at cylindrical segment 230 is O-ring 264. Positioned in groove 266 between housing 240 and cavity 217 at cylindrical segment 234 is O-ring seal 267. Positioned between housing 240 and the wall of cavity 217 at frusto-conical segment 233 is lip seal 238.

The solenoid actuator of the TCS solenoid valve 14 includes a case 270 which is substantially cylindrical in shape and functions to contain the solenoid actuator. A sleeve 272 comprised of ferromagnetic material is positioned inside the case 270. Sleeve 272 is substantially cylindrical.

An annular coil 274 formed of a plurality of turns of wire wound on a bobbin 276 is positioned within sleeve 272. A stop 278 is also positioned within case 270 and near its outer perimeter contacts sleeve 272.

Stop 278 includes cylindrical portion 279 which has an axial opening 277 and extends into the bobbin 276 of coil 274. Stop 278 is comprised of ferromagnetic material. An armature 282 comprised of a ferromagnetic material and cylindrical in shape exhibits axial opening 283. Armature 282 includes a first end 284 which is positioned within the axial opening 242 of housing 240 and a second end 285 which is positioned within the bobbin 276 of coil 274 near stop 278.

A sleeve 287 of non-magnetic material is cylindrical in shape and extends from within the axial opening 242 of housing 240 outwardly therefrom and through the coil 274. Sleeve 287 provides a bearing surface for armature 282 and operates to maintain the radial positioning of armature 282.

The sleeve 287 prevents the armature 282 from making contact with housing 240 to maintain a relatively small secondary air gap 291 between the housing 240 and armature 282 and operates to thereby increase the magnetic efficiency of the solenoid. The magnetic circuit's working air gap 292 is positioned between armature 282 and stop 278.

Positioned between the housing 240 and sleeve 287 is an O-ring 288. Near the opposite end of sleeve 287 and positioned between sleeve 287 and stop 278 is O-ring 289. The O-rings 288 and 289 act to prevent the transmission of high pressure fluid from the valve through the solenoid assembly.

A rod 294 is fixed in the axial opening 293 of armature 282. Rod 294 extends from armature 282 through the axial opening 251 of insert valve seat 250 and contacts ball 219. A rod guide 296 is positioned within the axial opening 242 of housing 240 and includes axial opening 297 through which rod 294 extends.

A spring 299 is positioned within the axial openings 277 and 283 and is compressed between the armature 282 and stop 278. Therefore, spring 299 operates to force armature 282 away from stop 278 and acts to maintain contact between end 295 of rod 294 and ball 219.

The actuator's magnetic circuit includes armature 282, stop 278, sleeve 272 and housing 240. Magnetic flux is generated in the circuit by coil 274. The working air gap 292 lies between armature 282 and stop 278 and the secondary air gap 291 is located between the armature 282 and the housing 280. Of importance to the actuator's performance are the magnetic circuit's lines of flux (not shown). The flux traverses the air gaps 291–292 and induces an electromagnetic force that acts upon the armature 282 and varies as the armature 282 moves, depending on the size of the working air gap 292 between the armature 282 and the stop 278.

The ball return spring 255 serves the function of the static load for the pressure relief function of the TCS solenoid valve 14. The ball return spring 255 is sized to hold the ball 219 against the insert valve seat 250 to maintain pressure in the wheel brake portion of the system, connected to the second port 223, at a predetermined maximum pressure. In the preferred embodiment the maximum pressure is approximately 1000 psi.

The invention utilizes a ball 219 which is independent of rod 294 thus facilitating assembly of the components. The armature return spring 299 is sized to be stronger than the ball return spring 255. Therefore, armature return spring 299 ensures that the ball 219 is held against valve seat 248 when the solenoid is in the de-energized state as shown in FIG. 2 and thus functions for isolating the first port 221 from the third port 225.

The ball return spring 255 and the armature return spring 299 work against each other and the force which must be produced by the actuator to move the armature 282 is the difference between the spring forces. When the ball 219 is seated on the insert valve seat 250 the actuator must overcome the entire force of the armature return spring 299 to maintain the position of armature 282. This is because all of the force used by the ball return spring 255 is offset by the reaction from the insert valve seat 250.

Therefore, as indicated above, the magnetic circuit is configured such that this is the position at which the armature 282 is closest to the stop 278 in the magnetic circuit. The magnetic force of the armature 282 at this small working air gap distance is relatively large for a given amount of electrical energy input into the coil 274. Thus, the electromagnetic force on armature 282 is able to overcome the force of the spring 299 and functions to ensure the operation of the ball return spring 255 for the pressure relief mode of operation of the TCS solenoid valve 14.

In the de-energized state, the armature return spring 299, as described above, is sized to be stronger than the ball return spring 259. This functions to ensure that the ball 219 is seated against the valve seat 248 when the solenoid is de-energized. Seating of the ball 219 isolates the third port 225 from the first port 221 and the second port 223. Concurrently, fluid from the first port 221 freely flows to the second port 223 through the TCS solenoid valve 14.

A one-directional free-flowing check valve arrangement comprised of lip seal 238 is provided which allows a rapid build up of pressure in the wheel brake portion of the brake system connected to the second port resulting from fluid flowing from the first port 221 to the second port 223 through the valve. This minimizes restriction to fluid flow through the valve between the first port 221 and the second port 223.

To provide for TCS intervention operation of the brake system the solenoid is energized and the TCS solenoid valve 14 takes a position wherein ball 219 is positioned against insert valve seat 250. This opens the passageway through axial opening 249 between the first port 221 and the third port 225. Concurrently, the wheel brake part of the fluid system connected to the second port 223 is isolated, providing the facility to build the pressure therein through operation of pump 32 in the part of the fluid system isolated therewith, including wheel brake 55.

Pressure in the wheel brake part of the fluid system connected to the second port 223 is permitted to build to a predetermined maximum pressure wherein the ball return spring 255 holds ball 219 against the insert valve seat 250 until that predetermined pressure is reached. When the pressure exceeds the predetermined maximum limit the ball 219 is released from the insert valve seat 250 by the compression of ball return spring 255 and fluid pressure is released to ports 221 and 225. The lip seal 238 operates to maintain the pressure in the part of the fluid system connected to the second port 223 by preventing flow from chamber 227 to chamber 228 between lip seal 238 and the wall of frusto-conical segment 233.

When the pressure in chamber 227 causes the ball 219 to become unseated from insert valve seat 250, fluid is permitted to flow from the wheel brake part of the fluid system connected to the second port 223 through the TCS solenoid valve 14 to the first port 221 and the third port 225 and therethrough, thereby providing a pressure relief function returning fluid to reservoir 24 or the inlet of pump 32.

As described above, through the design of the armature return spring 299 and the ball return spring 255 and through providing the lip seal 238, the TCS solenoid valve 14 is able to provide a two-position, three-way function, a check valve function and a pressure relief function in combination in one valve assembly.

Referring to FIG. 1, to engage traction control operation when incipient wheel slip is detected, the TCS solenoid valve 14 is energized. Concurrently, the pump motor 40 is turned on and remains on for the remainder of the traction control mode cycle. A hydraulic passageway is established through the TCS solenoid valve 14 allowing fluid communication between the inlet port of the pump 32 and the master cylinder reservoir 24. A second passageway is established between the outlet port of the pump 32 and the upstream side of the TCS solenoid valve's pressure relief 15 in axial opening 251 applying pressure to the bottom of ball 219 in the TCS solenoid valve 14 embodied in FIG. 2. Fluid pressure at port 223 as shown in FIG. 2, is trapped by the integral check 16 of TCS solenoid valve 14, which is embodied as lip seal 238 in FIG. 2.

Also, as a result of energizing TCS solenoid valve 14, the base brake passageway to the master cylinder 22 is blocked. From the formation of the hydraulic circuit by the energization of TCS solenoid valve 14, fluid is directed from the master cylinder reservoir 24, through the TCS solenoid valve 14 from port 221 to port 225, through the pump 32, where it is pressurized through port 223 against the pressure relief in axial opening 251 of the embodiment of FIG. 2. The TCS solenoid valve 14 will permit flow through the integral relief 15 only when the upstream pressure exceeds a prescribed magnitude. When the pressure surpasses the prescribed limit, flow through the relief 15 occurs and is directed to the master cylinder 22 and is effectively continuously recirculated to the inlet of pump 32 in the traction control hydraulic circuit. This is demonstrated in the embodiment of FIG. 2 wherein, during the relief function, fluid from axial opening 251 flows equally as well to ports 221 and 225.

In the brake system of FIG. 1, the pressurized fluid, as limited by the relief 15, flows through apply solenoid valve 20 to wheel brake 55 where pressure builds to the prescribed pressure as limited by relief 15. The prescribed pressure is sufficient to apply the wheel brake 55. Should the prescribed pressure be excessive for the specific TCS situation encountered, further regulation is provided by operation of the ABS function.

When ABS operation is initiated during TCS operation, just as in a normal ABS cycle initiated during base brake operation, the ABS apply solenoid valve 20 is immediately closed and the ABS release solenoid valve 21 is immediately opened to initiate a pressure release cycle. The opening of the ABS release solenoid valve 21 causes a responsive pressure drop at the wheel brake 55. This prevents further application of pressurized fluid to the wheel brake 55. Flow from the ABS release solenoid 21 essentially immediately starts to fill the pump inlet accumulator 44. The fluid simultaneously becomes available to the pump 32 for system pressurization with excess pressure initiating flow through the relief 15 of the TCS solenoid valve 14 to the master cylinder port 25 and the inlet of pump 32. Through the ABS operation an essentially immediate pressure drop at the wheel brake 55 is effected.

Once the fluid pressure at wheel brake 55 has been sufficiently reduced, ABS pressure apply is accomplished by closing the ABS release solenoid 21 and opening the ABS apply solenoid 20. If wheel lock again becomes incipient during the TCS cycle, release and apply supplemental cycles are repeated as often as necessary to achieve the desired ABS control. In addition, a pressure hold cycle may be incorporated wherein both the apply and release solenoid valves 20 and 21 are held hydraulically closed.

FIG. 5 illustrates a TCS solenoid valve 314 applied to a rear wheel brake 356 with apply orifice 380, base brake isolation valve 350 and release solenoid valve 323 provided for ABS control. The TCS solenoid valve 314 operates essentially the same as TCS solenoid valve 14 described in relation to FIG. 1. The base brake isolation valve 350 and the release solenoid valve 323 also operate in a like manner to the corresponding units described in relation to FIG. 1.

During base brake operation, fluid pressure from master cylinder 322 passes through proportioner 335 and TCS solenoid valve 314 to conductor 331. From conductor 331 parallel flow paths to wheel brake 356 are provided through apply orifice 380 and base brake isolation valve 350. Fluid flowing to chamber 349 of base brake isolation valve 350 travels past ball 385 through valve seat 389 into chamber 347 and continues through conductor 379 and proportioner 335 to wheel brake 356. Fluid flowing through apply orifice 380 continues on to chamber 348 of base brake isolation valve 350 where it substantially flows past lip seal 387 into chamber 347 and through conductor 379 to wheel brake 356.

The ABS mode of operation is engaged when a predetermined amount of wheel slip is detected in a braking stop and the ECU 390 determines that corrective action of brake pressure regulation is necessary. Motor 340 is immediately turned on. When ABS regulation of the rear wheel brake 356 is required, release solenoid valve 323 is energized to initiate a pressure release cycle. The opening of the normally closed release solenoid valve 323 causes an immediate pressure drop in chamber 348 of base brake isolation valve 350. This effects movement of piston 381 to compress spring 388 whereupon protrusion 351 retracts through valve seat 389 such that ball 385 is forced against ball seat 389 by spring 386 thus closing the check of base brake isolation valve 350. The check includes ball 385 which is forced against valve seat 389 by spring 386. The check remains closed until the hydraulic force imbalance between chambers 349 and 347 subsides and pressure is essentially equalized on both sides of the check ball 385, at which time the force of spring 388 is sufficient to reopen the check by unseating ball 385.

The reduced pressure in chamber 348 caused by the opening of the release solenoid valve 323 induces a fluid flow from wheel brake 356 into chamber 347 of base brake isolation valve 350 through ABS release orifice 383 and into chamber 348. From chamber 348 flow passes relatively uninhibited through release solenoid valve 323, is allowed to collect in accumulator 344 and is returned to the intake of pump 332. This action reduces braking force at wheel brake 356 and prevents wheel lock from occurring.

When the pressure at wheel brake 356 has been sufficiently reduced to prevent wheel lock the system begins increasing pressure at the wheel to maximize braking forces. This is accomplished by de-energizing release solenoid valve 323 and thus stopping flow through the ABS release orifice 383. Fluid flow produced by pump 332 passes through ABS apply orifice 380 into chamber 348 of base brake isolation valve 350, past lip seal 387, into chamber 347 and through conductor 379 and proportioner 335 to wheel brake 356. Therefore, ABS apply fluid flow passes through base brake isolation valve 350.

Routing the ABS apply fluid flow in this manner results in apply fluid pressure at wheel brake 356 being minimized during the ABS release cycles. This is because during pressure release, apply fluid traveling through apply orifice 380 and reaching chamber 348 is preferentially carried through conductor 375 and release solenoid valve 323 rather than being applied to wheel brake 356 through conductor 379. Therefore, the embodiment of FIG. 5 enables achieving low pressure at wheel brake 356. Ball 385 of base brake isolation valve 350 remains seated on ball seat 389 for essentially the entirety of an ABS release cycle. This prevents unorificed fluid flow from the master cylinder 322 to the wheel brake 356.

The lip seal 387 is integral in establishing ABS apply fluid flow during an apply cycle in a bypass route around the release orifice 383.

During ABS apply cycles, if wheel lock is again approached, supplemental release and apply cycles are provided as often as required to achieve the desired ABS control.

During normal base brake and ABS operation TCS solenoid valve 314 provides a normally open flow path, supplemented by forward flow check valve 316, between master cylinder 322 and the parallel flow paths at apply orifice 380 and chamber 349 of base brake isolation valve 350. Therefore, the normal base brake and ABS operation of the braking circuit for wheel brake 356 is substantially unaffected by the presence of TCS solenoid valve 314.

During TCS intervention, TCS solenoid valve 314 is automatically repositioned such that fluid pressure in conductor 331 is communicated to master cylinder 322 only when the selected relief pressure of relief 315 is surpassed. Fluid pressure in conductors 331 and 379 and at wheel brake 356 is maintained by check 316, prohibiting flow to master cylinder 22. Simultaneously, TCS solenoid valve 314 places conductor 333 in communication with reservoir 324 through master cylinder 322 to ensure a supply of fluid is provided to pump 332 for TCS and ABS operation.

What is claimed is:

1. A brake system comprising:
   a master cylinder;
   a hydraulic pump;
   a wheel brake;
   a conductor circuit interconnecting the wheel brake with the master cylinder and the hydraulic pump;
   a traction control valve including an integral pressure relief, check and three way valve unit interconnected in the conductor circuit between the master cylinder and the wheel brake and communicating with the pump wherein the pressure relief and the three way valve is provided by a single movable ball alternately interacting with two opposed valve seats;
   an isolation valve and an integral apply fluid flow passage interconnected in the conductor circuit between the master cylinder and the wheel brake; and
   a release solenoid valve interconnected in the conductor circuit between the wheel brake and the pump.

2. A brake system according to claim 1 wherein the isolation valve and an integral apply fluid flow passage comprises a solenoid valve.

3. A brake system according to claim 1 wherein the isolation valve and an integral apply fluid flow passage comprises a base brake isolation valve in parallel with an apply orifice isolation valve assembly.

4. A brake system according to claim 1 wherein the isolation valve and an integral apply fluid flow passage comprises a base brake isolation valve with an apply orifice in series with a deflectable lip seal in the base brake isolation valve.

5. A brake system comprising:
   a master cylinder;
   a conductor circuit interconnected with the master cylinder in the braking system;
   a hydraulic pump having an outlet and an inlet interconnected in the conductor circuit;
   a wheel brake interconnected in the conductor circuit;
   a release solenoid valve being normally closed and interconnected in the conductor circuit between the wheel brake and the pump inlet;
   means for providing base brake isolation and a completely closable normally open apply fluid flow passage interconnected in the conductor circuit between the wheel brake and both the master cylinder and pump outlet; and
   a solenoid valve having first, second and third ports interconnected in the conductor circuit, the first port being normally open to the second port and alternately open to the third port wherein the first port is in fluid communication with the master cylinder, the second port is in fluid communication with a segment of the brake channel circuit between the pump outlet and the means for providing a completely closable normally open apply passage and the third port is in fluid communication with a segment of the conductor circuit between the release solenoid valve and the pump inlet.

6. A brake system comprising:
   a master cylinder;
   a conductor circuit interconnected with the master cylinder in the braking system;
   a hydraulic pump interconnected in the conductor circuit;
   a first wheel brake interconnected in the conductor circuit;
   a pump having an outlet and an inlet interconnected in the conductor circuit;
   a release solenoid valve being normally closed and interconnected in the conductor circuit between the wheel brake and the pump inlet;
   an apply solenoid valve providing a completely closable normally open apply passage interconnected in the conductor circuit between the first wheel brake and both the master cylinder and pump outlet;
   a second wheel brake interconnected in the conductor circuit;
   a base brake isolation valve interconnected in the conductor circuit between the master cylinder and the second wheel brake;
   an apply orifice isolation valve interconnected in the conductor circuit between the master cylinder and the second wheel brake; and
   a traction control solenoid valve having first, second and third ports interconnected in the conductor circuit, the first port being normally open to the second port and alternately open to the third port wherein the first port is in fluid communication with the master cylinder, the second port is in fluid communication with a segment of the conductor circuit between the pump outlet and the means for providing a completely closable normally open apply passage and the third port is in fluid communication with a segment of the conductor circuit between the release solenoid valve and the pump inlet.

7. A brake system according to claim 6 further comprising a proportioner interconnected in the conductor circuit between the master cylinder and the base brake isolation valve.

8. A brake system according to claim 6 wherein the traction control solenoid valve includes an integral pressure relief between the second port and the first and third ports.

9. A brake system according to claim 8 wherein the traction control solenoid valve includes an integral check between the first port and the third port.

* * * * *